US012608334B2

(12) United States Patent
Ma et al.

(10) Patent No.: US 12,608,334 B2
(45) Date of Patent: Apr. 21, 2026

(54) METHOD, SYSTEM AND DEVICE FOR PARALLEL PROCESSING OF DATA, AND STORAGE MEDIUM

(71) Applicant: SHENZHEN CORERAIN TECHNOLOGIES CO., LTD., Guangdong (CN)

(72) Inventors: Kai Ma, Guangdong (CN); Chao Xiong, Guangdong (CN); Kuen Hung Tsoi, Guangdong (CN); Xinyu Niu, Guangdong (CN)

(73) Assignee: SHENZHEN CORERAIN TECHNOLOGIES CO., LTD., Shenzhen (CN)

( * ) Notice: Subject to any disclaimer, the term of this patent is extended or adjusted under 35 U.S.C. 154(b) by 969 days.

(21) Appl. No.: 17/789,280

(22) PCT Filed: Dec. 23, 2020

(86) PCT No.: PCT/CN2020/138539
§ 371 (c)(1),
(2) Date: Jun. 27, 2022

(87) PCT Pub. No.: WO2021/129645
PCT Pub. Date: Jul. 1, 2021

(65) Prior Publication Data
US 2023/0035910 A1 Feb. 2, 2023

(30) Foreign Application Priority Data
Dec. 27, 2019 (CN) .......................... 201911373599.2

(51) Int. Cl.
*G06F 15/78* (2006.01)
*G06F 9/38* (2018.01)
(Continued)

(52) U.S. Cl.
CPC ........ *G06F 15/7821* (2013.01); *G06F 9/3867* (2013.01); *G06F 9/4881* (2013.01); *G06F 9/5022* (2013.01); *G06F 9/5066* (2013.01)

(58) Field of Classification Search
CPC .. G06F 15/7821; G06F 9/3867; G06F 9/4881; G06F 9/5022; G06F 9/5066
See application file for complete search history.

(56) References Cited

U.S. PATENT DOCUMENTS 6,009,264 A * 12/1999 Merritt .................. G06F 9/5072
719/330
10,140,252 B2 11/2018 Fowers et al.
(Continued)

FOREIGN PATENT DOCUMENTS

CN 109740916 A 5/2019
CN 110321210 A 10/2019
(Continued)

OTHER PUBLICATIONS

PCT/CN2019/183539 International Search Report dated Mar. 22, 2021.

*Primary Examiner* — Kevin L Young
*Assistant Examiner* — Carina Yun
(74) *Attorney, Agent, or Firm* — Maier & Maier, PLLC

(57) ABSTRACT

Provided are a method for the parallel processing of data, a device, and a storage medium. The method includes: identifying, from multiple first computing nodes, at least three first computing nodes which have a logical relationship are identified and defining the at least three first computing nodes which have the logical relationship as a first parallel node group, where the first parallel node group includes a first preceding node and at least two first subsequent nodes; acquiring a first input data model of the first preceding node and generating a first input tensor of the first preceding node; computing a first output tensor of the first preceding node (Continued)

according to the first input data model and the first input tensor; and acquiring a second input data model of the at least two first subsequent nodes and using the first output tensor as a second input tensor.

12 Claims, 3 Drawing Sheets

(51) Int. Cl.
    *G06F 9/48*         (2006.01)
    *G06F 9/50*         (2006.01)

(56)                References Cited

U.S. PATENT DOCUMENTS

| | | | |
|---|---|---|---|
| 2011/0010581 A1* | 1/2011 | Tanttu | H04M 15/53 |
| | | | 714/E11.073 |
| 2016/0239276 A1* | 8/2016 | Maclean | G06F 8/433 |
| 2018/0113825 A1* | 4/2018 | Huggins | G06F 13/4282 |
| 2019/0114537 A1* | 4/2019 | Wesolowski | G06N 3/084 |

FOREIGN PATENT DOCUMENTS

| | | |
|---|---|---|
| CN | 110321999 A | 10/2019 |
| CN | 110383206 A | 10/2019 |
| CN | 111145076 A | 5/2020 |

* cited by examiner

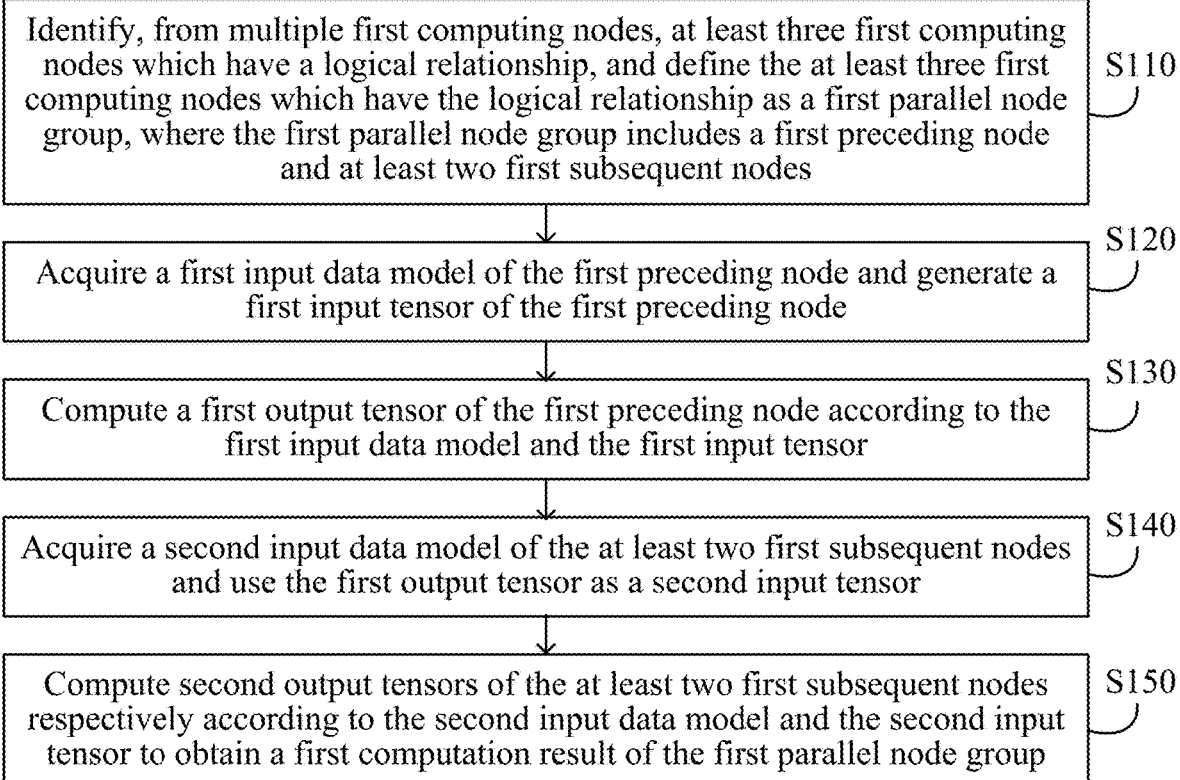

Identify, from multiple first computing nodes, at least three first computing nodes which have a logical relationship, and define the at least three first computing nodes which have the logical relationship as a first parallel node group, where the first parallel node group includes a first preceding node and at least two first subsequent nodes    S110

Acquire a first input data model of the first preceding node and generate a first input tensor of the first preceding node    S120

Compute a first output tensor of the first preceding node according to the first input data model and the first input tensor    S130

Acquire a second input data model of the at least two first subsequent nodes and use the first output tensor as a second input tensor    S140

Compute second output tensors of the at least two first subsequent nodes respectively according to the second input data model and the second input tensor to obtain a first computation result of the first parallel node group    S150

FIG. 1

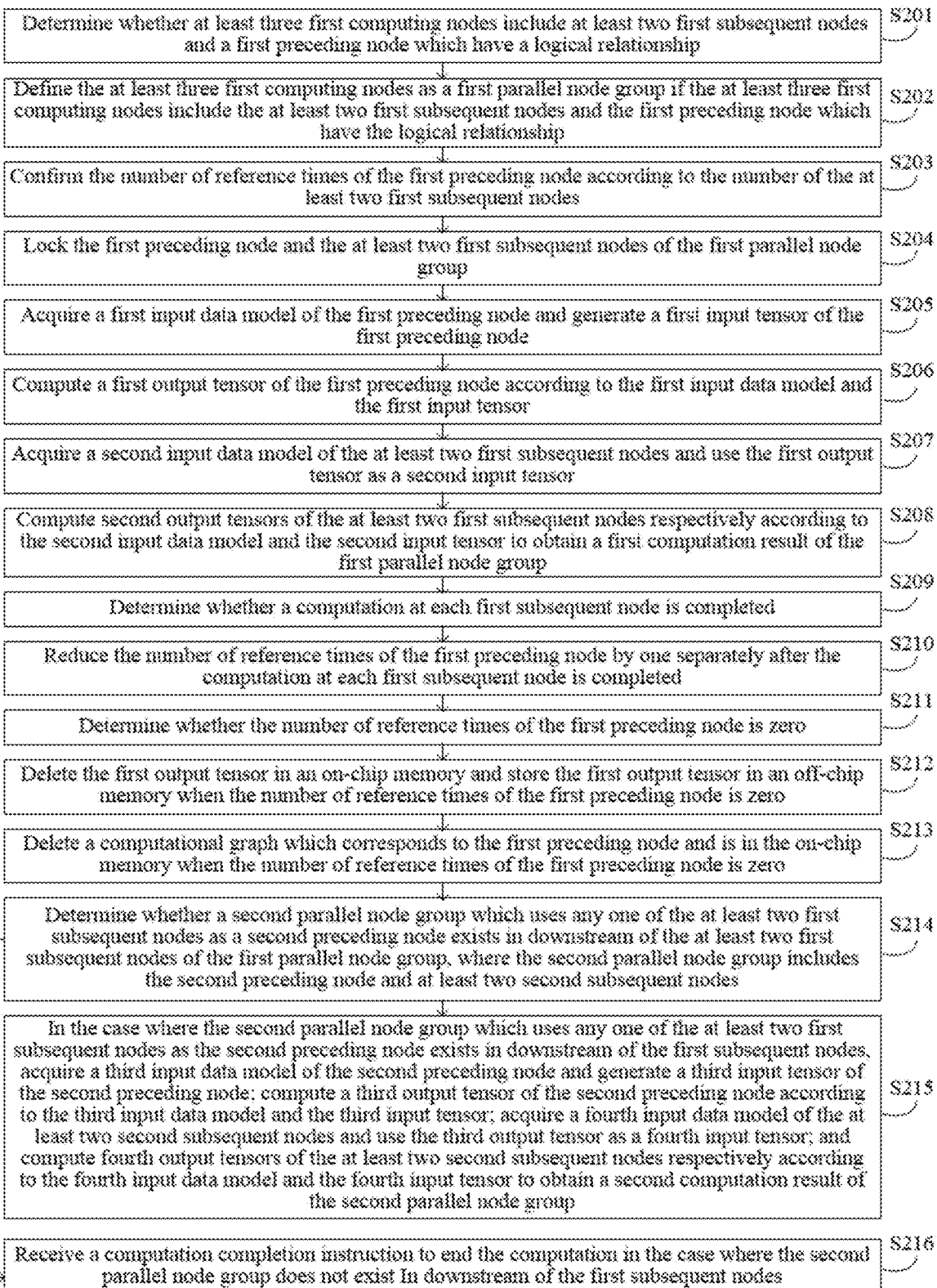

Determine whether at least three first computing nodes include at least two first subsequent nodes and a first preceding node which have a logical relationship — S201

Define the at least three first computing nodes as a first parallel node group if the at least three first computing nodes include the at least two first subsequent nodes and the first preceding node which have the logical relationship — S202

Confirm the number of reference times of the first preceding node according to the number of the at least two first subsequent nodes — S203

Lock the first preceding node and the at least two first subsequent nodes of the first parallel node group — S204

Acquire a first input data model of the first preceding node and generate a first input tensor of the first preceding node — S205

Compute a first output tensor of the first preceding node according to the first input data model and the first input tensor — S206

Acquire a second input data model of the at least two first subsequent nodes and use the first output tensor as a second input tensor — S207

Compute second output tensors of the at least two first subsequent nodes respectively according to the second input data model and the second input tensor to obtain a first computation result of the first parallel node group — S208

Determine whether a computation at each first subsequent node is completed — S209

Reduce the number of reference times of the first preceding node by one separately after the computation at each first subsequent node is completed — S210

Determine whether the number of reference times of the first preceding node is zero — S211

Delete the first output tensor in an on-chip memory and store the first output tensor in an off-chip memory when the number of reference times of the first preceding node is zero — S212

Delete a computational graph which corresponds to the first preceding node and is in the on-chip memory when the number of reference times of the first preceding node is zero — S213

Determine whether a second parallel node group which uses any one of the at least two first subsequent nodes as a second preceding node exists in downstream of the at least two first subsequent nodes of the first parallel node group, where the second parallel node group includes the second preceding node and at least two second subsequent nodes — S214

In the case where the second parallel node group which uses any one of the at least two first subsequent nodes as the second preceding node exists in downstream of the first subsequent nodes, acquire a third input data model of the second preceding node and generate a third input tensor of the second preceding node; compute a third output tensor of the second preceding node according to the third input data model and the third input tensor; acquire a fourth input data model of the at least two second subsequent nodes and use the third output tensor as a fourth input tensor; and compute fourth output tensors of the at least two second subsequent nodes respectively according to the fourth input data model and the fourth input tensor to obtain a second computation result of the second parallel node group — S215

Receive a computation completion instruction to end the computation in the case where the second parallel node group does not exist in downstream of the first subsequent nodes — S216

FIG. 2

METHOD, SYSTEM AND DEVICE FOR PARALLEL PROCESSING OF DATA, AND STORAGE MEDIUM

CROSS-REFERENCE TO RELATED APPLICATIONS

This is a National Stage Application filed under 35 U.S.C. 371 based on International Patent Application No. PCT/CN2020/138539, filed on Dec. 23, 2020, which claims priority to Chinese Patent Application No. 201911373599.2 filed on Dec. 27, 2019, disclosures of both of which are incorporated herein by reference in their entireties.

TECHNICAL FIELD

Embodiments of the present application relate to the technical field of network topology graph reasoning, for example, a method for the parallel processing of data, a device, and a storage medium.

BACKGROUND

Deep learning networks are typically obtained through algorithm training. In most cases, algorithm developers tend to use existing open deep learning frameworks for performing model training, but most of the open deep learning frameworks are designed for computing devices such as a central processing unit (CPU)/a graphics processing unit (GPU). The CPU/GPU uses a traditional instruction set architecture, which has relatively low architecture efficiency and relatively great flexibility. With the development of technologies relating to deep learning, the requirement for computational power is increasing. A defect in the architecture efficiency of an instruction set in the related art cannot meet the requirements of an application scenario. In contrast, data flow architecture is more efficient, which is more suitable for the development trend of deep learning technology in terms of the technical route. However, a data flow chip is only applicable to a deep learning operator. For the normal use of the data stream chip, the CPU is still needed to assist in data transmission and processing. During running, processed data is transmitted from a memory to an on-chip memory. A result is retrieved after the running of a computing card is completed. The post-processing is performed to complete an entire graph reasoning process.

Most graph reasoning methods used in the related art run in a single-threaded manner with asynchronous computations, but such graph reasoning methods easily result in that the computing resources of the CPU and the computing card cannot be fully utilized.

SUMMARY

The present application provides a method for the parallel processing of data, a device, and a storage medium so as to achieve the technical effect that graph reasoning for multiple inputs can run in an overlapping manner so that the resources of a CPU and a computing card are fully utilized.

In an embodiment, the embodiment of the present application provides a method for the parallel processing of data. The method includes the steps described below.

At least three first computing nodes which have a logical relationship are identified from multiple first computing nodes, and the at least three first computing nodes which have the logical relationship are defined as a first parallel node group, where the first parallel node group includes a first preceding node and at least two first subsequent nodes.

A first input data model of the first preceding node is acquired and a first input tensor of the first preceding node is generated.

A first output tensor of the first preceding node is computed according to the first input data model and the first input tensor.

A second input data model of the at least two first subsequent nodes is acquired and the first output tensor is used as a second input tensor.

Second output tensors of the at least two first subsequent nodes are computed respectively according to the second input data model and the second input tensor so that a first computation result of the first parallel node group is obtained.

In an embodiment, the embodiment of the present application further provides a device.

The device includes a memory and one or more processors.

The memory is configured to store one or more programs.

When executing the one or more programs, the one or more processors implement any method for the parallel processing of data according to the preceding embodiment.

In an embodiment, the embodiment of the present application further provides a computer-readable storage medium which is configured to store computer programs which, when executed by a processor, implement any method for the parallel processing of data according to the preceding embodiment.

BRIEF DESCRIPTION OF DRAWINGS

FIG. 1 is a flowchart of a method for the parallel processing of data according to an embodiment of the present application;

FIG. 2 is a flowchart of another method for the parallel processing of data according to an embodiment of the present application;

DETAILED DESCRIPTION

Figure 3:
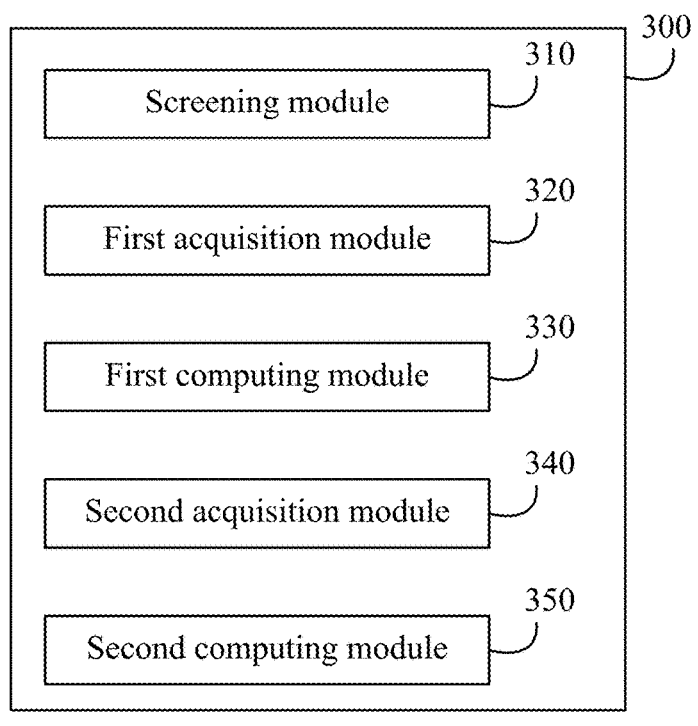
FIG. 3 is a structural diagram of a system for the parallel processing of data according to an embodiment of the present application.

The present application is described below in conjunction with drawings and embodiments. The embodiments set forth below are intended to only illustrate the present application and not to limit the present application. For ease of description, only part, not all, of structures related to the present application are illustrated in the drawings.

Some exemplary embodiments are described as processing or methods depicted in flowcharts. Although a flowchart describes one or more steps as sequential processing, many of the steps may be performed concurrently, coincidently, or simultaneously. Additionally, the sequence of the one or more steps may be rearranged. The processing may be terminated when operations of the processing are completed. However, the processing may further have additional steps not included in the drawings. The processing may correspond to a method, a function, a procedure, a subroutine, a subprogram, or the like.

Furthermore, the terms "first", "second", and the like may be used herein to describe various directions, actions, steps, elements, or the like, but these directions, actions, steps, or elements are not limited by these terms. These terms are only used for distinguishing a first direction, action, step, or element from another direction, action, step, or element. For example, without departing from the scope of the present application, a first acquisition module may be referred to as a second acquisition module, and similarly, the second acquisition module may be referred to as the first acquisition module. The first acquisition module and the second acquisition module are both acquisition modules, but they are not the same acquisition module. Terms like "first" and "second" are not to be construed as indicating or implying relative importance or implicitly indicating the number of technical features as indicated. Thus, a feature defined as a "first" feature or a "second" feature may explicitly or implicitly include one or more of such features. As described herein, the term "a plurality of" is defined as at least two, for example, two, three, or the like, unless otherwise expressly limited.

Embodiment One

FIG. 1 is a flowchart of a method for the parallel processing of data according to embodiment one of the present application. This embodiment is applicable to the reasoning case of multiple graphs with logical relationships. This method may be performed by a host. As shown in FIG. 1, a method for the parallel processing of data includes steps S110 to S150.

In S110, at least three first computing nodes which have a logical relationship are identified from multiple first computing nodes, and the at least three first computing nodes which have the logical relationship are defined as a first parallel node group, where the first parallel node group includes a first preceding node and at least two first subsequent nodes.

In this embodiment, the at least three first computing nodes having the logical relationship refer to that the three first computing nodes include at least one first preceding node which is located upstream in the logical relationship and at least two first subsequent nodes which are located downstream of the first preceding node and have a direct logical relationship with the first preceding node. When data computations are performed at the first subsequent nodes, a data processing result of the first preceding node is first received and used as input data of the first subsequent nodes. That is, after a computation at the first preceding node is completed, an obtained computation result of the first preceding node is transmitted to the at least two first subsequent nodes directly associated with the first preceding node, and the obtained computation result of the first preceding node is used as input data of the first subsequent nodes.

The computation at a computing node of a neural network is used as an example. The neural network generally has multiple layers, that is, multiple computing nodes which are logically connected in sequence. In an embodiment, the first preceding node may refer to a layer of a neural network model computation where the computation is started first, and the first subsequent nodes may refer to layers of the neural network model computation where computations are started immediately after the computation at the first preceding node. The first preceding node may also refer to an n-th layer of the neural network model computation, and the first subsequent nodes may refer to an (n+1)-th layer of the neural network model computation, which is not limited in this embodiment. Types of neural networks in this embodiment include a feedforward neural network, a radial basis function neural network, a deep feedforward neural network, a recursive neural network, and the like, and the type of a first neural network is not limited herein.

In S120, a first input data model of the first preceding node is acquired and a first input tensor of the first preceding node is generated.

In this embodiment, an input data model refers to a data model for data input such as a calculation formula or a computational model for a node in each layer of the neural network, and an input tensor refers to a vector with input data.

In S130, a first output tensor of the first preceding node is computed according to the first input data model and the first input tensor.

In this embodiment, an output tensor refers to a vector with output data. After the first input data model and the first input tensor of the first preceding node are obtained by S120, the computation is performed at the first preceding node to obtain a data computation result of the first preceding node. The data computation result is the first output tensor in this embodiment.

In S140, a second input data model of the at least two first subsequent nodes is acquired and the first output tensor is used as a second input tensor.

In an embodiment, after the computation at the first preceding node is completed, the second input data model of the first subsequent nodes is acquired, and the first output tensor is used as input data of the first subsequent nodes so that the second input tensor is obtained.

In S150, second output tensors of the at least two first subsequent nodes are computed respectively according to the second input data model and the second input tensor so that a first computation result of the first parallel node group is obtained.

In an embodiment, based on the second input data model and the second input tensor obtained in S140, a computation is performed at each of the first subsequent nodes separately according to the number of the first subsequent nodes so that a data computation result of each of the first subsequent nodes is obtained. The second output tensor is generated according to the data computation result of each of the first subsequent nodes so that a total computation result of the first parallel node group, that is, the first computation result is obtained.

In embodiment one of the present application, data processing is performed in parallel at multiple nodes having a logical relationship, thereby solving the problem that the computing resources of a CPU and a computing card cannot be fully utilized in the related art and achieving the effect that the graph reasoning for the multiple inputs runs in the overlapping manner so that the resources of the CPU and the computing card are fully utilized.

Embodiment Two

Embodiment two of the present application is an optional embodiment based on embodiment one. FIG. 2 is a flowchart of a method for the parallel processing of data according to embodiment two of the present application. As shown in FIG. 2, a method for the parallel processing of data in this embodiment includes steps S201 to S216.

In S201, it is determined whether the at least three first computing nodes include the at least two first subsequent nodes and the first preceding node which have the logical relationship.

In an embodiment, after the multiple first computing nodes are received, the at least three first computing nodes are selected from these first computing nodes and it is determined whether the three computing nodes have the logical relationship, that is, whether the at least one first preceding node and the at least two first subsequent nodes exist. The computation at the computing node of the neural network is used as the example. The neural network generally has the multiple layers, that is, the multiple computing nodes which are logically connected in sequence. In an embodiment, the first preceding node may refer to the layer of the neural network model computation where the computation is started first, and the first subsequent nodes may refer to the layers of the neural network model computation where the computations are started immediately after the computation at the first preceding node. The first preceding node may also refer to the n-th layer of the neural network model computation, and the first subsequent nodes may refer to the (n+1)-th layer of the neural network model computation, which is not limited in this embodiment. The types of neural networks in this embodiment include the feedforward neural network, the radial basis function neural network, the deep feedforward neural network, the recursive neural network, and the like, and the type of the first neural network is not limited herein.

In S202, the at least three first computing nodes are defined as the first parallel node group if the at least three first computing nodes include the at least two first subsequent nodes and the first preceding node which have the logical relationship.

In an embodiment, when the at least three first computing nodes include the at least two first subsequent nodes and the first preceding node which have the logical relationship, that is, the three first computing nodes form a minimum logical relationship group, the three first computing nodes may be defined as the first parallel node group.

In S203, the number of reference times of the first preceding node is confirmed according to the number of the at least two first subsequent nodes.

In an embodiment, the number of reference times of the first preceding node may be determined according to the number of the first subsequent nodes which have the direct logical relationship and exist in downstream of each first preceding node. For example, when three first subsequent nodes are directly associated downstream of the first preceding node in terms of logic, that is, the computation result (that is, the first output tensor) obtained through the computation at the first preceding node is directly transmitted to the three first subsequent nodes which receive the first output tensor in parallel as their own input data (that is, the second input tensor), the first preceding node is referenced three times and the number of reference times of the first preceding node is set to three before the computation is performed.

In S204, the first preceding node and the at least two first subsequent nodes of the first parallel node group are locked.

In an embodiment, that is, this embodiment, before computation is performed, the first preceding node and the first subsequent nodes in the first parallel node group may be locked first.

The purpose of the locking is to ensure that the computations are performed at different nodes to avoid memory waste caused by repeated computations at the same node.

In S205, the first input data model of the first preceding node is acquired and the first input tensor of the first preceding node is generated.

In this embodiment, the input data model refers to the data model for the data input such as the calculation formula or the computational model for the node in each layer of the neural network, and the input tensor refers to the vector with the input data.

In S206, the first output tensor of the first preceding node is computed according to the first input data model and the first input tensor.

In this embodiment, the output tensor refers to the vector with the output data. After the first input data model and the first input tensor of the first preceding node are obtained by S205, the computation is performed at the first preceding node to obtain the data computation result of the first preceding node. The data computation result is the first output tensor in this embodiment.

In S207, the second input data model of the at least two first subsequent nodes is acquired and the first output tensor is used as the second input tensor.

In an embodiment, after the computation at the first preceding node is completed, the second input data model of the first subsequent nodes is acquired, and the first output tensor is received and used as the input data of the first subsequent nodes so that the second input tensor is obtained.

In S208, the second output tensors of the at least two first subsequent nodes are computed respectively according to the second input data model and the second input tensor so that the first computation result of the first parallel node group is obtained.

In an embodiment, based on the second input data model obtained in S207 such as the calculation formula or the computational model for the node in each layer of the neural network and the second input tensor, the computation is performed at each of the first subsequent nodes separately according to the number of the first subsequent nodes so that the data computation result of each of the first subsequent nodes is obtained. The second output tensor is generated according to the data computation result of each of the first subsequent nodes so that the total computation result of the first parallel node group, that is, the first computation result is obtained.

In S209, it is determined whether the computation at each first subsequent node is completed.

In an embodiment, after S208 is completed, that is, the first computation result is obtained, it is further determined whether the computation at each first subsequent node in the first parallel node group is completed, which can ensure the accuracy of the first computation result.

In S210, the number of reference times of the first preceding node is reduced by one separately after the computation at each first subsequent node is completed.

In an embodiment, when the data processing is performed in parallel at each first subsequent node, the number of reference times of the first preceding node is reduced by one after the computation at any first subsequent node in the first parallel node group is completed. For example, when the first parallel node group includes the one first preceding node and the two first subsequent nodes, it is known that the number of reference times of the first preceding node is two according to S203. The first output tensor is obtained after the computation at the first preceding node is completed, and the first output tensor is separately transmitted to the two first subsequent nodes. In this case, the parallel processing and computations of data are performed at the two first subsequent nodes. When the computations at the first subsequent nodes are completed, a feedback instruction indicating the completion of computations may be generated separately and sent to a reference time counter of the first preceding node. After receiving the feedback instruction indicating the completion of computations, the counter reduces the number of reference times in the counter by one separately, thereby updating a reference relationship in the logical relationship between the first preceding node and the first subsequent nodes in the first parallel node group.

In S211, it is determined whether the number of reference times of the first preceding node is zero.

In an embodiment, the number of reference times of the first preceding node is updated by S210, and it is determined in real time whether the number of reference times of the first preceding node is zero, which can detect whether the computations are completed at all the first subsequent nodes which have the direct logical relationship with the first preceding node.

In S212, the first output tensor in an on-chip memory is deleted and the first output tensor is stored in an off-chip memory when the number of reference times of the first preceding node is zero.

In an embodiment, when the number of reference times of the first preceding node is zero, that is, in this case, the computations are completed at all the downstream first subsequent nodes which have the direct logical relationship with the first preceding node and the second output tensor is obtained, the first output tensor stored in a cache may be deleted and the first output tensor is stored in a memory.

In S213, a computational graph which corresponds to the first preceding node and is in the on-chip memory is deleted when the number of reference times of the first preceding node is zero.

In an embodiment, when the number of reference times of the first preceding node is zero, the first input data model of the first preceding node stored in the cache is deleted, thereby saving storage resources.

In S214, it is determined whether a second parallel node group which uses any one of the at least two first subsequent nodes as a second preceding node exists in downstream of the at least two first subsequent nodes of the first parallel node group, where the second parallel node group includes the second preceding node and at least two second subsequent nodes.

In an embodiment, after the computations are completed at both the first preceding node and the first subsequent nodes which are included in the first parallel node group, it is determined whether the second parallel node group is located downstream of the logic relationship of the first parallel node group, where both the second parallel node group and the first parallel node group are groups including at least three first computing nodes.

In S215, in the case where the second parallel node group which uses any one of the at least two first subsequent nodes as the second preceding node exists in downstream of the first subsequent nodes, a third input data model of the second preceding node is acquired and a third input tensor of the second preceding node is generated: a third output tensor of the second preceding node is computed according to the third input data model and the third input tensor: a fourth input data model of the at least two second subsequent nodes is acquired and the third output tensor is used as a fourth input tensor; and fourth output tensors of the at least two second subsequent nodes are computed respectively according to the fourth input data model and the fourth input tensor so that a second computation result of the second parallel node group is obtained.

In an embodiment, when the second parallel node group also exists in downstream of the first subsequent nodes, the second computation result may be obtained by performing computations according to the method for performing the computations in the first parallel node group when the computations are performed in the second parallel node group.

In S216, a computation completion instruction is received to end the computation in the case where the second parallel node group does not exist in downstream of the first subsequent nodes.

In an embodiment, when the second parallel node group does not exist in downstream of the first subsequent nodes, one computation completion instruction is generated and sent to the host, so as to notify the host to end the computation.

In embodiment two of the present application, the data processing is performed in parallel at the multiple nodes having the logical relationship, and nodes in each parallel node group are locked, thereby solving the problem that the computing resources of the CPU and the computing card cannot be utilized in the related art and achieving the effect that the graph reasoning for the multiple inputs runs in the overlapping manner and nodes in the computational graph are separately locked so that the resources of the CPU and the computing card are fully utilized.

Embodiment Three

FIG. 3 is a structural diagram of a system for the parallel processing of data according to embodiment three of the present application. As shown in FIG. 3, a system 300 for the parallel processing of data in this embodiment includes a screening module 310, a first acquisition module 320, a first computing module 330, a second acquisition module 340, and a second computing module 350.

The screening module 310 is configured to identify, from multiple first computing nodes, at least three first computing nodes which have a logical relationship and define the at least three first computing nodes which have the logical relationship as a first parallel node group, where the first parallel node group includes a first preceding node and at least two first subsequent nodes.

The first acquisition module 320 is configured to acquire a first input data model of the first preceding node and generate a first input tensor of the first preceding node.

The first computing module 330 is configured to compute a first output tensor of the first preceding node according to the first input data model and the first input tensor.

The second acquisition module 340 is configured to acquire a second input data model of the at least two first subsequent nodes and use the first output tensor as a second input tensor.

The second computing module 350 is configured to compute second output tensors of the at least two first subsequent nodes respectively according to the second input data model and the second input tensor so that a first computation result of the first parallel node group is obtained.

In this embodiment, the screening module 310 includes a first determination unit and a first definition unit.

The first determination unit is configured to determine whether the at least three first computing nodes include the at least two first subsequent nodes and the first preceding node which have the logical relationship.

The first definition unit is configured to define the at least three first computing nodes as the first parallel node group if the least three first computing nodes include the at least two second-first subsequent nodes and the first preceding node which have the logical relationship.

In this embodiment, the system 300 for the parallel processing of data further includes a reference module.

The reference module is configured to confirm the number of reference times of the first preceding node according to the number of the at least two first subsequent nodes.

In this embodiment, the system 300 for the parallel processing of data further includes a locking module.

The locking module is configured to lock the first preceding node and the at least two first subsequent nodes of the first parallel node group.

In this embodiment, the system 300 for the parallel processing of data further includes a first determination module, an updating module, a second determination module, and a first deletion module.

The first determination module is configured to determine whether a computation at each first subsequent node is completed:

The updating module is configured to reduce the number of reference times of the first preceding node by one separately after the computation at each first subsequent node is completed.

The second determination module is configured to determine whether the number of reference times of the first preceding node is zero.

The first deletion module is configured to delete the first output tensor in an on-chip memory and store the first output tensor in an off-chip memory when the number of reference times of the first preceding node is zero.

In this embodiment, the system 300 for the parallel processing of data further includes a second deletion module.

The second deletion module is configured to delete a computational graph which corresponds to the first preceding node and is in the on-chip memory when the number of reference times of the first preceding node is zero.

In this embodiment, the system 300 for the parallel processing of data further includes a third determination module, a third computing module, and an ending module.

The third determination module is configured to determine whether a second parallel node group which uses any one of the at least two first subsequent nodes as a second preceding node exists in downstream of the at least two first subsequent nodes of the first parallel node group, where the second parallel node group includes the second preceding node and at least two second subsequent nodes.

The third computing module is configured to, in the case where the second parallel node group which uses any one of the at least two first subsequent nodes as the second preceding node exists in downstream of the first subsequent nodes, acquire a third input data model of the second preceding node and generate a third input tensor of the second preceding node: compute a third output tensor of the second preceding node according to the third input data model and the third input tensor: acquire a fourth input data model of the at least two second subsequent nodes and use the third output tensor as a fourth input tensor; and compute fourth output tensors of the at least two second subsequent nodes respectively according to the fourth input data model and the fourth input tensor so that a second computation result of the second parallel node group is obtained.

The ending module is configured to receive a computation completion instruction to end the computation in the case where the second parallel node group does not exist in downstream of the first subsequent nodes.

The device for the parallel processing of data provided in the embodiment of the present application can perform the method provided in any embodiment of the present application and has functional modules and beneficial effects corresponding to the performed methods.

Embodiment Four

Figure 4:
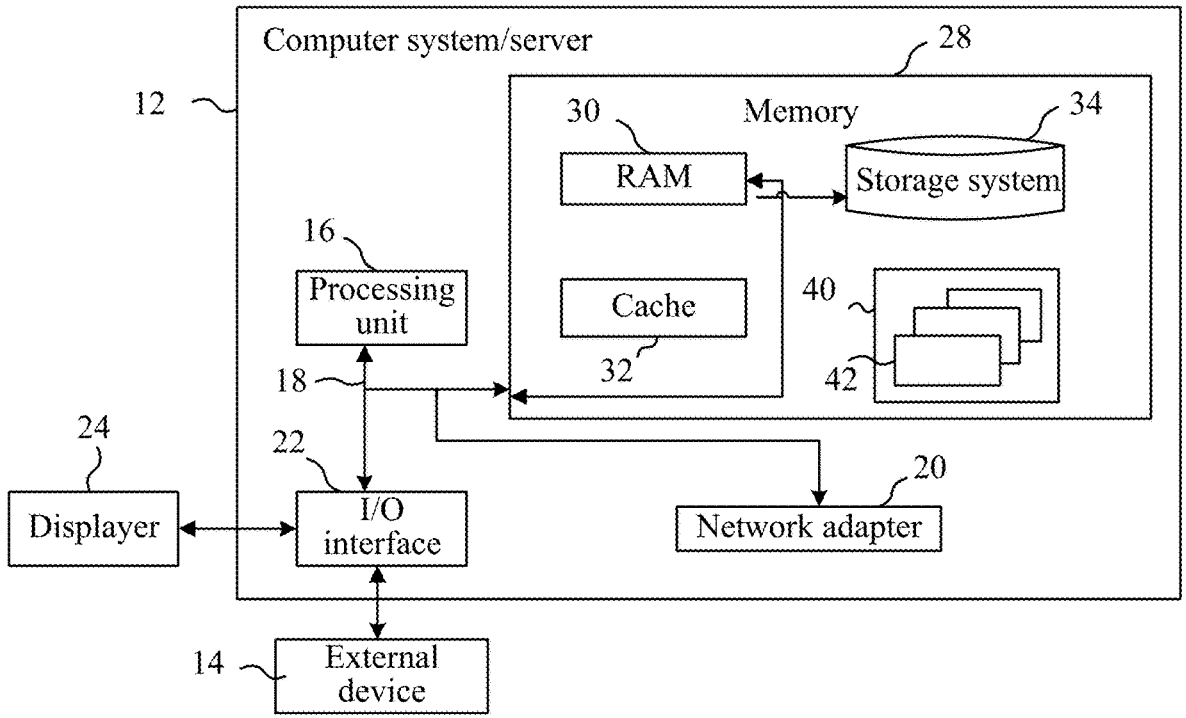
FIG. 4 is a structural diagram of a device according to an embodiment of the present application.

FIG. 4 is a structural diagram of a device according to embodiment four of the present application. FIG. 4 shows a block diagram of an exemplary computer device 12 (that is, the computer system/server in FIG. 4) for implementing embodiments of the present application. The computer device 12 shown in FIG. 4 is merely an example and not intended to limit the function and use scope of the embodiment of the present application.

As shown in FIG. 4, the computer device 12 may take a form of a general-purpose computer device. Components of the computer device 12 may include one or more processors or processing units 16, a system memory 28, and a bus 18 connecting different system components (including the system memory 28 and the processing units 16).

The bus 18 represents one or more of several types of bus structures, including a memory bus or a memory controller, a peripheral bus, an accelerated graphics port, and a processor, or the bus 18 represents a local bus using any one of multiple bus structures. For example, such architectures include an Industry Standard Architecture (ISA) bus, a Micro Channel architecture (MCA) bus, an Enhanced ISA bus, a Video Electronics Standards Association (VESA) local bus, and a Peripheral Component Interconnect (PCI) bus.

The computer device 12 includes multiple computer system readable media. These media may be available media which can be accessed by the computer device 12, including volatile and non-volatile media, and removable and non-removable media.

The system memory 28 (that is, the memory in FIG. 4) may include computer system readable media in the form of volatile memory, such as random-access memory (RAM) 30 and/or a cache 32. The computer device 12 may include other removable/non-removable and volatile/non-volatile computer system storage media. By way of example only, a storage system 34 may be configured to perform reading and writing on a non-removable and non-volatile magnetic medium (not shown in FIG. 4 and usually referred to as a "hard disk driver"). Although not shown in FIG. 4, a magnetic disk driver for reading from or writing to a removable and non-volatile magnetic medium (such as a "floppy disk"), and an optical disk driver for reading from or writing to a removable and non-volatile optical disk (such as a portable compact disc read-only memory (CD-ROM), a digital video disc-read only memory (DVD-ROM), or other optical media) may be provided. In these cases, each driver may be connected to the bus 18 by one or more data media interfaces. The memory 28 may include at least one program product having a group of program modules (for example, at least one program module). These program modules are configured to perform functions of multiple embodiments of the present application.

A program/utility 40, having a group (at least one) of program modules 42, may be stored in the memory 28. Such program modules 42 include an operating system, one or more application programs, other program modules, and program data. Each or some combination of these examples may include the implementation of a networking environment. The program modules 42 generally perform functions and/or methods in the embodiments of the present application.

The computer device 12 may also communicate with one or more external devices 14 (such as a keyboard, a pointing device, and a displayer 24). The computer device 12 may further communicate with one or more devices which enable a user to interact with the computer device 12, and/or with any device (such as a network card or a modem) which enables the computer device 12 to communicate with one or more other computing devices. Such communications may be performed through an input/output (I/O) interface 22. Moreover, the computer device 12 may communicate with one or more networks (such as a local area network (LAN), a wide area network (WAN), and/or a public network, for example, the Internet) through a network adapter 20. As shown in the figure, the network adapter 20 communicates with other modules of the computer device 12 via the bus 18. Although not shown in the figure, other hardware and/or software modules may be used in conjunction with the computer device 12. Such other hardware and/or software modules include a microcode, a device driver, a redundant processor, an external disk drive array, a redundant arrays of independent drives (RAID) system, a tape driver, a data backup storage system, and the like.

The processing units 16 execute a program stored in the system memory 28 to perform various functional applications and data processing, for example, to implement the method provided in the embodiment of the present application. The method includes the steps described below:

At least three first computing nodes which have a logical relationship are identified from multiple first computing nodes, and the at least three first computing nodes which have the logical relationship are defined as a first parallel node group, where the first parallel node group includes a first preceding node and at least two first subsequent nodes.

A first input data model of the first preceding node is acquired and a first input tensor of the first preceding node is generated.

A first output tensor of the first preceding node is computed according to the first input data model and the first input tensor.

A second input data model of the at least two first subsequent nodes is acquired and the first output tensor is used as a second input tensor.

Second output tensors of the at least two first subsequent nodes are computed respectively according to the second input data model and the second input tensor so that a first computation result of the first parallel node group is obtained.

Embodiment Five

Embodiment five of the present application further provides a computer-readable storage medium which is configured to store computer programs which, when executed by a processor, implement the method according to all embodiments of the present application. The method includes the steps described below.

At least three first computing nodes which have a logical relationship are identified from multiple first computing nodes, and the at least three first computing nodes which have the logical relationship are defined as a first parallel node group, where the first parallel node group includes a first preceding node and at least two first subsequent nodes.

A first input data model of the first preceding node is acquired and a first input tensor of the first preceding node is generated.

A first output tensor of the first preceding node is computed according to the first input data model and the first input tensor.

A second input data model of the at least two first subsequent nodes is acquired and the first output tensor is used as a second input tensor.

Second output tensors of the at least two first subsequent nodes are computed respectively according to the second input data model and the second input tensor so that a first computation result of the first parallel node group is obtained.

The computer storage medium in the embodiment of the present application may use any combination of one or more computer-readable media. The computer-readable medium may be a computer-readable signal medium or a computer-readable storage medium. The computer-readable storage medium may include, for example, an electrical, magnetic, optical, electromagnetic, infrared, or semiconductor system, apparatus, or device, or any combination thereof. Examples of the computer-readable storage medium include (non-exhaustive list): an electrical connection having one or more wires, a portable computer magnetic disk, a hard disk, a random-access memory (RAM), a read-only memory (ROM), an erasable programmable read only memory (electrically erasable programmable read-only memory (EE-PROM), EPROM, or a flash memory), an optical fiber, a portable compact disc read-only memory (CD-ROM), an optical memory device, a magnetic memory device, or any suitable combination thereof. In this document, the computer-readable storage medium may be any tangible medium including or storing a program. The program may be used by or used in conjunction with an instruction execution system, apparatus, or device.

The computer-readable signal medium may include a data signal propagated in a baseband or as part of a carrier. The data signal carries computer-readable program codes. This propagated data signal may take multiple forms including an electromagnetic signal, an optical signal, or any suitable combination thereof. The computer-readable signal medium may further be any computer-readable medium other than the computer-readable storage medium. The computer-readable medium may send, propagate, or transmit the program used by or used in conjunction with the instruction execution system, apparatus, or device.

The program code included in the computer-readable medium may be transmitted using a suitable medium, including a wireless medium, a wired medium, an optical cable, a radio frequency (RF), and the like, or any suitable combination thereof.

Computer program codes for performing the operations of the present application may be written in one or more programming languages or a combination thereof, where the programming languages include object-oriented programming languages such as Java, Smalltalk, and C++ and further include conventional procedural programming languages such as the C programming language or similar programming languages. The program codes may be executed entirely on a user computer, partly on the user computer, as a stand-alone software package, partly on the user computer and partly on a remote computer, or entirely on the remote computer or a server. In the case where the remote computer is involved, the remote computer may be connected to the user computer via any type of network including a local area network (LAN) or a wide area network (WAN) or connected to an external computer (for example, through the Internet using an Internet service provider).

What is claimed is:

1. A computer-implemented method for parallel processing of data on a computer comprising a processor, wherein the method comprises:

identifying, using the processor, from a plurality of first computing nodes, at least three first computing nodes which have a logical relationship, and defining, using the processor, the at least three first computing nodes which have the logical relationship as a first parallel node group, wherein the first parallel node group comprises a first preceding node and at least two first subsequent nodes, and wherein the at least two first subsequent nodes are located downstream of the first preceding node and have a direct logical relationship with the first preceding node;

acquiring, using the processor, a first input data model of the first preceding node and generating a first input tensor of the first preceding node;

computing, using the processor, a first output tensor of the first preceding node according to the first input data model and the first input tensor;

acquiring, using the processor, a second input data model of the at least two first subsequent nodes and using the first output tensor as a second input tensor; and computing, using the processor, a second output tensor of each first subsequent node respectively according to the second input data model and the second input tensor to obtain a first computation result of the first parallel node group;

before acquiring the first input data model of the first preceding node and generating the first input tensor of the first preceding node, further comprising:

confirming, using the processor, a number of reference times of the first preceding node according to a number of the at least two first subsequent nodes;

after computing the second output tensors of the at least two first subsequent nodes respectively according to the second input data model and the second input tensor to obtain the first computation result of the first parallel node group, further comprising:

determining, using the processor, whether a computation at each first subsequent node is completed;

reducing, using the processor, the number of reference times of the first preceding node by one separately after the computation at each first subsequent node is completed;

determining, using the processor, whether the number of reference times of the first preceding node is zero; and deleting, using the processor, the first output tensor in an on-chip memory and storing the first output tensor in an off-chip memory in a case where the number of reference times of the first preceding node is zero;

after deleting the first output tensor in the on-chip memory and storing the first output tensor in the off-chip memory in the case where the number of reference times of the first preceding node is zero, further comprising:

determining, using the processor, whether a second parallel node group which uses any one of the at least two first subsequent nodes as a second preceding node exists in downstream of the at least two first subsequent nodes of the first parallel node group, wherein the second parallel node group comprises the second preceding node and at least two second subsequent nodes;

in a case where the second parallel node group which uses any one of the at least two first subsequent nodes as the second preceding node exists in downstream of the at least two first subsequent nodes, acquiring, using the processor, a third input data model of the second preceding node and generating, using the processor, a third input tensor of the second preceding node; computing, using the processor, a third output tensor of the second preceding node according to the third input data model and the third input tensor; acquiring, using the processor, a fourth input data model of the at least two second subsequent nodes and using the third output tensor as a fourth input tensor; and computing, using the processor, fourth output tensors of the at least two second subsequent nodes respectively according to the fourth input data model and the fourth input tensor to obtain a second computation result of the second parallel node group; and receiving, using the processor, a computation completion instruction to end a computation in a case where the second parallel node group does not exist in downstream of the at least two first subsequent nodes.

2. The method according to claim 1, wherein identifying, using the processor, from the plurality of first computing nodes, the at least three first computing nodes which have the logical relationship, and defining the at least three first computing nodes which have the logical relationship as the first parallel node group comprises:

determining whether the at least three first computing nodes comprise the at least two first subsequent nodes and the first preceding node which have the logical relationship; and defining the at least three first computing nodes as the first parallel node group in response to the at least three first computing nodes comprising the at least two first subsequent nodes and the first preceding node which have the logical relationship.

3. The method according to claim 1, before acquiring the first input data model of the first preceding node and generating the first input tensor of the first preceding node, further comprising:

locking, using the processor, the first preceding node of the first parallel node group and the at least two first subsequent nodes of the first parallel node group.

4. The method according to claim 1, after deleting the first output tensor in the on-chip memory and storing the first output tensor in the off-chip memory in the case where the number of reference times of the first preceding node is zero, further comprising:

deleting, using the processor, a computational graph which corresponds to the first preceding node and is in the on-chip memory.

5. A device, comprising:

one or more processors; and a memory configured to store one or more programs;

wherein the one or more programs when executed by the one or more processors cause the one or more processors to perform operations, the operations comprising:

identifying, from a plurality of first computing nodes, at least three first computing nodes which have a logical relationship, and defining the at least three first computing nodes which have the logical relationship as a first parallel node group, wherein the first parallel node group comprises a first preceding node and at least two first subsequent nodes, and wherein the at least two first subsequent nodes are located downstream of the first preceding node and have a direct logical relationship with the first preceding node;

acquiring a first input data model of the first preceding node and generating a first input tensor of the first preceding node;

computing a first output tensor of the first preceding node according to the first input data model and the first input tensor;

acquiring a second input data model of the at least two first subsequent nodes and using the first output tensor as a second input tensor; and computing a second output tensor of each first subsequent node respectively according to the second input data model and the second input tensor to obtain a first computation result of the first parallel node group;

wherein before acquiring the first input data model of the first preceding node and generating the first input tensor of the first preceding node, the operations further comprise:

confirming a number of reference times of the first preceding node according to a number of the at least two first subsequent nodes;

wherein after computing the second output tensors of the at least two first subsequent nodes respectively according to the second input data model and the second input tensor to obtain the first computation result of the first parallel node group, the operations further comprise:

determining whether a computation at each first subsequent node is completed;

reducing the number of reference times of the first preceding node by one separately after the computation at each first subsequent node is completed;

determining whether the number of reference times of the first preceding node is zero; and deleting the first output tensor in an on-chip memory and storing the first output tensor in an off-chip memory in a case where the number of reference times of the first preceding node is zero;

wherein after deleting the first output tensor in the on-chip memory and storing the first output tensor in the off-chip memory in the case where the number of reference times of the first preceding node is zero, the operations further comprise:

determining whether a second parallel node group which uses any one of the at least two first subsequent nodes as a second preceding node exists in downstream of the at least two first subsequent nodes of the first parallel node group, wherein the second parallel node group comprises the second preceding node and at least two second subsequent nodes;

in a case where the second parallel node group which uses any one of the at least two first subsequent nodes as the second preceding node exists in downstream of the at least two first subsequent nodes, acquiring a third input data model of the second preceding node and generating a third input tensor of the second preceding node; computing a third output tensor of the second preceding node according to the third input data model and the third input tensor; acquiring a fourth input data model of the at least two second subsequent nodes and using the third output tensor as a fourth input tensor; and computing fourth output tensors of the at least two second subsequent nodes respectively according to the fourth input data model and the fourth input tensor to obtain a second computation result of the second parallel node group; and receiving a computation completion instruction to end a computation in a case where the second parallel node group does not exist in downstream of the at least first subsequent nodes.

6. The device according to claim 5, wherein identifying, from the plurality of first computing nodes, the at least three first computing nodes which have the logical relationship, and defining the at least three first computing nodes which have the logical relationship as the first parallel node group comprise:

determining whether the at least three first computing nodes comprise the at least two first subsequent nodes and the first preceding node which have the logical relationship; and defining the at least three first computing nodes as the first parallel node group in response to the at least three first computing nodes comprising the at least two first subsequent nodes and the first preceding node which have the logical relationship.

7. The device according to claim 5, wherein before acquiring the first input data model of the first preceding node and generating the first input tensor of the first preceding node, the operations further comprise:

locking the first preceding node of the first parallel node group and the at least two first subsequent nodes of the first parallel node group.

8. The device according to claim 5, wherein after deleting the first output tensor in the on-chip memory and storing the first output tensor in the off-chip memory in the case where the number of reference times of the first preceding node is zero, the operations further comprise:

deleting a computational graph which corresponds to the first preceding node and is in the on-chip memory.

9. A non-transitory computer-readable storage medium configured to store computer programs which, when executed by a processor, cause the processor to perform operations, the operations comprising:

identifying, from a plurality of first computing nodes, at least three first computing nodes which have a logical relationship, and defining the at least three first computing nodes which have the logical relationship as a first parallel node group, wherein the first parallel node group comprises a first preceding node and at least two first subsequent nodes, and wherein the at least two first subsequent nodes are located downstream of the first preceding node and have a direct logical relationship with the first preceding node;

acquiring a first input data model of the first preceding node and generating a first input tensor of the first preceding node;

computing a first output tensor of the first preceding node according to the first input data model and the first input tensor;

acquiring a second input data model of the at least two first subsequent nodes and using the first output tensor as a second input tensor; and computing a second output tensor of each first subsequent node respectively according to the second input data model and the second input tensor to obtain a first computation result of the first parallel node group;

wherein before acquiring the first input data model of the first preceding node and generating the first input tensor of the first preceding node, the operations further comprise:

confirming a number of reference times of the first preceding node according to a number of the at least two first subsequent nodes;

wherein after computing the second output tensors of the at least two first subsequent nodes respectively according to the second input data model and the second input tensor to obtain the first computation result of the first parallel node group, the operations further comprise:
determining whether a computation at each first subsequent node is completed:
reducing the number of reference times of the first preceding node by one separately after the computation at each first subsequent node is completed;
determining whether the number of reference times of the first preceding node is zero; and
deleting the first output tensor in an on-chip memory and storing the first output tensor in an off-chip memory in a case where the number of reference times of the first preceding node is zero;
wherein after deleting the first output tensor in the on-chip memory and storing the first output tensor in the off-chip memory in the case where the number of reference times of the first preceding node is zero, the operations further comprise:
determining whether a second parallel node group which uses any one of the at least two first subsequent nodes as a second preceding node exists in downstream of the at least two first subsequent nodes of the first parallel node group, wherein the second parallel node group comprises the second preceding node and at least two second subsequent nodes;
in a case where the second parallel node group which uses any one of the at least two first subsequent nodes as the second preceding node exists in downstream of the at least two first subsequent nodes, acquiring a third input data model of the second preceding node and generating a third input tensor of the second preceding node; computing a third output tensor of the second preceding node according to the third input data model and the third input tensor; acquiring a fourth input data model of the at least two second subsequent nodes and using the third output tensor as a fourth input tensor; and computing fourth output tensors of the at least two second subsequent nodes respectively according to the fourth input data model and the fourth input tensor to obtain a second computation result of the second parallel node group; and
receiving a computation completion instruction to end a computation in a case where the second parallel node group does not exist in downstream of the at least first subsequent nodes.

10. The non-transitory computer-readable storage medium according to claim 9, wherein identifying, from the plurality of first computing nodes, the at least three first computing nodes which have the logical relationship, and defining the at least three first computing nodes which have the logical relationship as the first parallel node group comprise:
determining whether the at least three first computing nodes comprise the at least two first subsequent nodes and the first preceding node which have the logical relationship; and
defining the at least three first computing nodes as the first parallel node group in response to the at least three first computing nodes comprising the at least two first subsequent nodes and the first preceding node which have the logical relationship.

11. The non-transitory computer-readable storage medium according to claim 9, wherein before acquiring the first input data model of the first preceding node and generating the first input tensor of the first preceding node, the operations further comprise:
locking the first preceding node of the first parallel node group and the at least two first subsequent nodes of the first parallel node group.

12. The non-transitory computer-readable storage medium according to claim 9, wherein after deleting the first output tensor in the on-chip memory and storing the first output tensor in the off-chip memory in the case where the number of reference times of the first preceding node is zero, the operations further comprise:
deleting a computational graph which corresponds to the first preceding node and is in the on-chip memory.

* * * * *